(12) United States Patent
Tokura et al.

(10) Patent No.: US 7,169,079 B2
(45) Date of Patent: Jan. 30, 2007

(54) CONTROL APPARATUS AND METHOD FOR AUTOMATIC TRANSMISSION

(75) Inventors: Takaaki Tokura, Toyota (JP); Norimi Asahara, Nishikamo-gun (JP); Katsumi Kono, Toyota (JP); Ryoichi Hibino, Nagoya (JP); Hiroyuki Nishizawa, Tajimi (JP); Masataka Osawa, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 141 days.

(21) Appl. No.: 10/667,451

(22) Filed: Sep. 23, 2003

(65) Prior Publication Data

US 2004/0067817 A1 Apr. 8, 2004

(30) Foreign Application Priority Data

Oct. 2, 2002 (JP) .............................. 2002-289510

(51) Int. Cl.
*B60W 10/06* (2006.01)
*B60W 10/10* (2006.01)

(52) U.S. Cl. ...................................... 477/107; 477/109

(58) Field of Classification Search ................ 477/107, 477/109, 110
See application file for complete search history.

(56) References Cited

U.S. PATENT DOCUMENTS

| 4,355,550 | A | * | 10/1982 | Will et al. | ................... | 477/107 |
|---|---|---|---|---|---|---|
| 4,770,064 | A | * | 9/1988 | Kuerschner | ................. | 477/109 |
| 5,072,631 | A | * | 12/1991 | Fujimoto et al. | ........... | 477/107 |
| 5,559,694 | A | * | 9/1996 | Kraemer et al. | ............. | 477/107 |
| 5,816,976 | A | * | 10/1998 | Kuroiwa et al. | ............ | 477/110 |
| 5,822,708 | A | * | 10/1998 | Wagner et al. | .............. | 477/109 |
| 6,023,647 | A | * | 2/2000 | Saito et al. | .................. | 477/107 |
| 6,319,170 | B1 | * | 11/2001 | Hubbard et al. | ............ | 477/107 |
| 6,364,811 | B1 | * | 4/2002 | Hubbard et al. | ............ | 477/107 |
| 6,594,573 | B1 | | 7/2003 | Rossmann et al. | | |
| 6,656,087 | B1 | * | 12/2003 | Runde et al. | ................ | 477/107 |

FOREIGN PATENT DOCUMENTS

| JP | 2-308934 A | 12/1990 |
|---|---|---|
| JP | A 2-308934 | 12/1990 |
| JP | 7-90719 B2 | 10/1995 |
| JP | A 10-30466 | 2/1998 |
| JP | A 2002-31225 | 1/2002 |
| JP | A 2003-509643 | 3/2003 |

* cited by examiner

*Primary Examiner*—Sherry Estremsky
(74) *Attorney, Agent, or Firm*—Kenyon & Kenyon LLP

(57) ABSTRACT

A control apparatus and method control a torque of an engine coupled to an input shaft of an automatic transmission during a shift by that automatic transmission. A torque-down control by which the engine torque is decreased by a predetermined amount is performed, a torque-restore control starting point at which time torque-restore control is to be started is determined, and the torque-restore control so as to gradually restore the engine torque to a value before the torque-down control was performed is started at the torque-restore control starting point. The torque-restore control starting point is determined according to a dynamic model which simulates behavior of the automatic transmission over time from start of the torque-down control, so that a rotational speed of the input shaft of the automatic transmission at a target point substantially matches a target speed.

8 Claims, 3 Drawing Sheets

PRIOR ART

CONTROL APPARATUS AND METHOD FOR AUTOMATIC TRANSMISSION

INCORPORATION BY REFERENCE

The disclosure of Japanese Patent Application No. 2002-289510 filed on Oct. 2, 2002, including the specification, drawings and abstract is incorporated herein by reference in its entirety.

BACKGROUND OF THE INVENTION

1. Field of the Invention

This invention relates to a control apparatus and method for an automatic transmission mounted in an automobile or the like. More specifically, this invention relates to a method for determining timing to start torque-restore control.

2. Description of the Related Art

FIG. 3 is a block diagram showing the arrangement of apparatuses and their general relationships with respect to control of a typical engine and automatic transmission. Because this drawing has also been applied to a related example, it will be used to describe control of an engine 10 and an automatic transmission 12 in a vehicle, which is disclosed in JPA 2-308934. An ECU (electronic control unit) 14 controls the operation of various valves and plugs and the like in the engine 10 while monitoring the rpm and the like of the engine 10 using various sensors provided therein. A transmission control apparatus 16 controls a clutch and the like provided in the automatic transmission while monitoring the rotational speed and the like of an input shaft from the engine 10 to the automatic transmission 12 using various sensors provided in the automatic transmission 12. Further, the ECU 14 and the transmission control apparatus 16 work in coordination to execute typical torque-down control during shifting and torque-restore control following that shift.

Torque-down control in this case is control which is executed during a shift to reduce shift shock and extend the life of frictional engagement elements. This control temporarily reduces the torque output by the engine 10, i.e., engine torque, by a predetermined amount. At the same time that this control starts, the automatic transmission moves into an inertia phase and the rotational speed of the input shaft of the automatic transmission 12 gradually slows and approaches the speed that it needs to be for synchronization when the shift ends, i.e., approaches a shift-end synchronous speed. Ideally, it is preferable that the point at which a predetermined target time, i.e., a target inertia phase time, has elapsed from the start of the torque-down control, i.e., from the start of the inertia phase, be made the shift-end point, and that the rotational speed of the input shaft of the automatic transmission 12 at that shift-end point substantially match the target speed for the shift-end synchronous speed. Also, it is necessary that the engine torque, which has been reduced by the torque-down control, be returned to the value that it was before that torque-down control at the end of the shift. Therefore, torque-restore control which gradually increases the engine torque up to the value that it was before the start of the torque-down control is started at an appropriate point in the inertia phase.

The technology in JPA2-308934, however, estimates and detects a degree of change in the shift based on the difference between the current speed of rotating members inside the automatic transmission and the speed of those members at the end of the shift, and, based on those results, adaptively adjusts the amount of change of the engine torque in the torque-restore control. Detection of the degree of change in the shift is done using a map created with consideration given to various numerical values and quantities of state, such as the engine throttle opening amount, engine speed, and gear speed of the automatic transmission. Creating this map requires a tremendous number of man-hours.

SUMMARY OF THE INVENTION

In view of the foregoing drawbacks, this invention thus provides a control apparatus which focuses on the behavior of an automatic transmission over time and obviates the need to both detect the degree of change in the shift and create a map and the like beforehand for that detection, and can therefore be realized at a lower cost than the related art.

According to one aspect of the invention, a control apparatus is provided which controls a torque of an engine coupled to an input shaft of an automatic transmission during a shift by that automatic transmission. The control apparatus includes a controller which i) performs torque-down control by which the engine torque is decreased by a predetermined amount, ii) determines, during the torque-down control, a torque-restore control starting point at which time torque-restore control is to be started, and iii) starts the torque-restore control at that torque-restore control starting point so as to gradually restore the engine torque to a value before the torque-down control was performed. Here, the controller determines the torque-restore control starting point according to a dynamic model which simulates the behavior of the automatic transmission over time from the start of the torque-down control, and so that a rotational speed of the input shaft of the automatic transmission at a target point comes to substantially match a target speed.

Also, according to another aspect of the invention, a control method is provided for controlling a torque of an engine that is coupled to an input shaft of an automatic transmission during a shift by that automatic transmission. This control method includes the steps of i) performing torque-down control for reducing the engine torque by a predetermined amount, ii) determining, during that torque-down control, a torque-restore control starting point according to a dynamic model which simulates the behavior of the automatic transmission over time from the start of the torque-down control, and so that a rotational speed of the input shaft of the automatic transmission at a target point comes to substantially match a target speed, and iii) starting the torque-restore control at the torque-restore control starting point so as to gradually restore the engine torque to the value before the torque-down control was performed.

According to the control apparatus and method described above, determining the torque-restore control starting point using the dynamic model obviates the need for creating the map and the like, thereby enabling costs to be kept down. Also, the dynamic model used is one which simulates the behavior of the automatic transmission over time from the start of the torque-down control, e.g., one which correlates the rotational speed of the input shaft of the automatic transmission at the target point with the time elapsed after the start of the torque-down control. Therefore, the engine torque preferably finishes being restored at the same time that the inertia phase ends. This minimizes shift shock and extends the life of the frictional engagement elements. In particular, the precision of that synchronization is further improved by repeatedly executing a process for estimating the rotational speed of the input shaft of the automatic transmission using the dynamic model. Also, each of the effects is able to be preferably achieved with relative ease by integrating at least one of an amount of change in the engine torque that will likely occur by the target point and an amount of change in the torque transmission capacity of the clutch in the automatic transmission, and incorporating it into the dynamic model, i.e., by incorporating it as an integrated term in proportional integral control.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

In the following description and the accompanying drawings, the present invention will be described in more detail in terms of exemplary embodiments.

Figure 3:
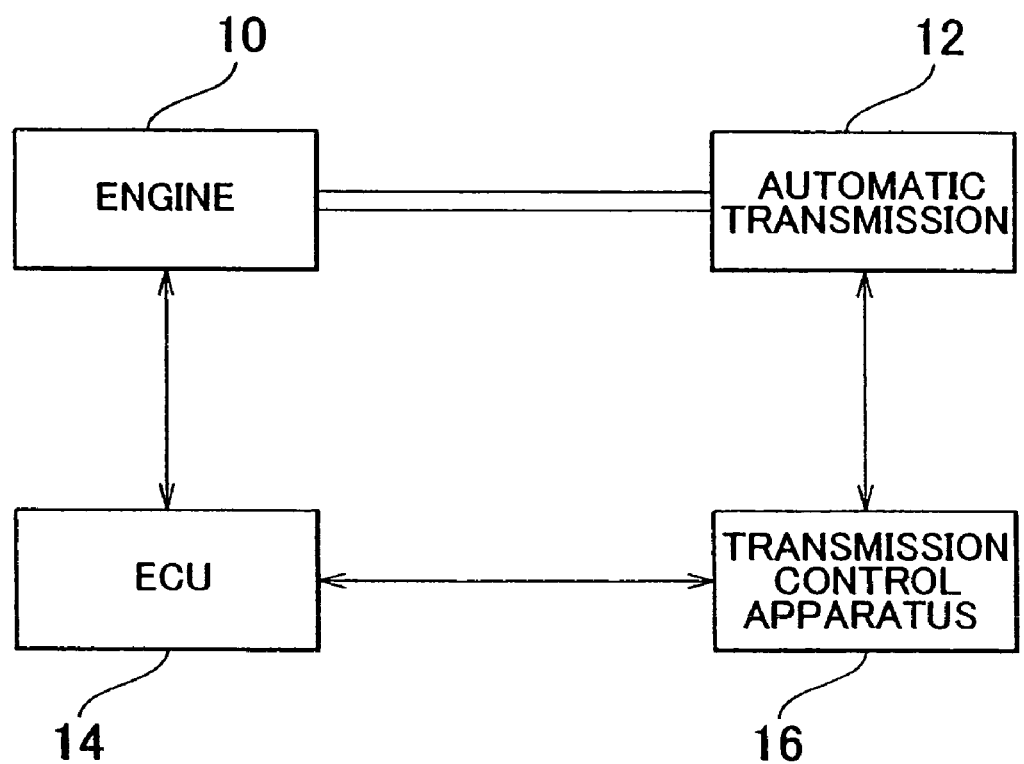
FIG. 3 is a block diagram illustrating one example of the arrangement of the apparatuses.

The invention can be realized with the arrangement of the apparatuses shown in FIG. 3. This arrangement will therefore be assumed in the following description of the exemplary embodiment. Also, from the disclosure of this application, modifications and variations of details with respect to the apparatuses and their arrangement, as well as with the order of the steps, to be described later, will readily occur to those skilled in the art. Accordingly, all such variations and modifications are included within the intended scope of the invention.

Figure 1:
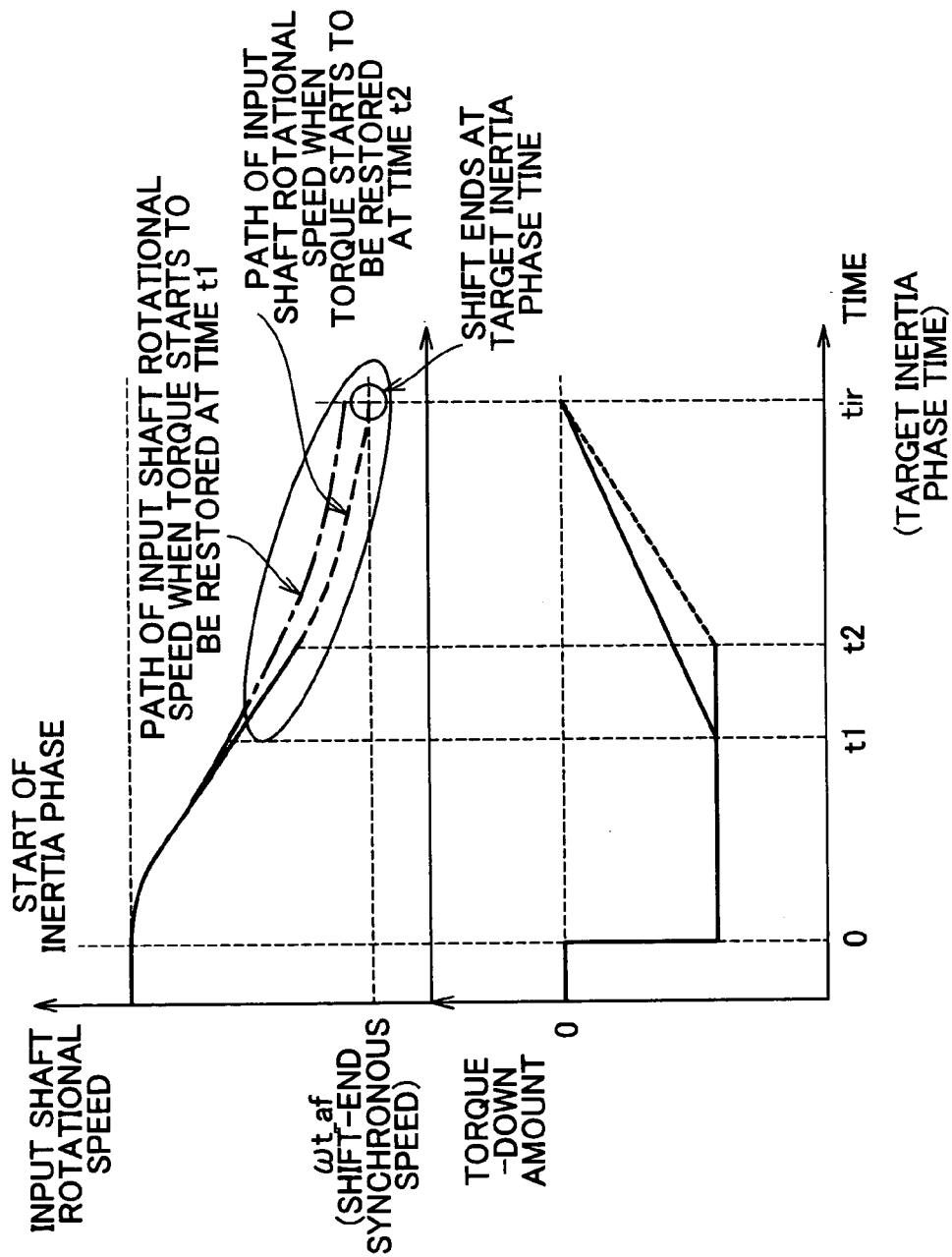
FIG. 1 is a time chart illustrating one example of control timing according to one exemplary embodiment of the invention.
Figure 2:
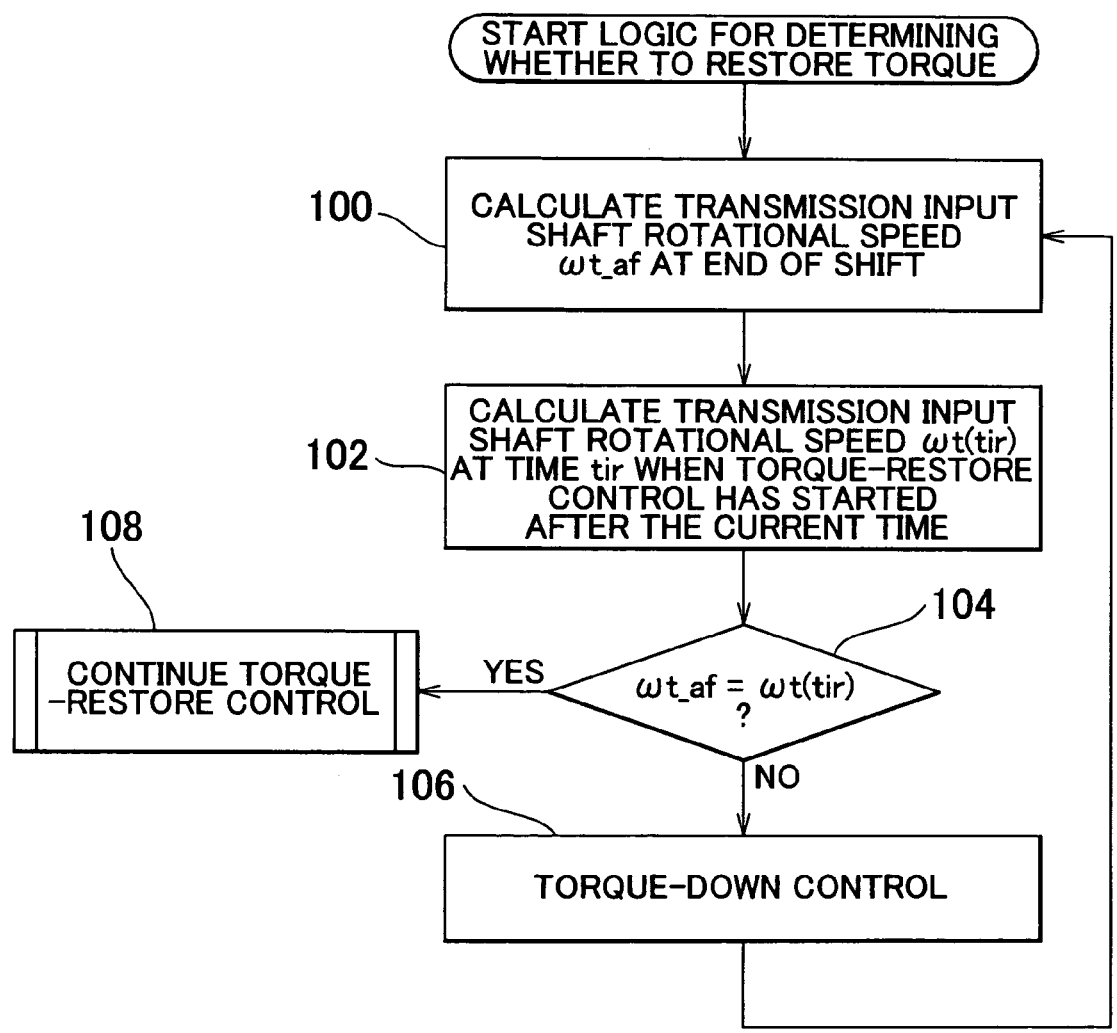
FIG. 2 is a flowchart illustrating control flow according to the exemplary embodiment.

FIG. 1 illustrates control timing and FIG. 2 illustrates control flow according to a preferred exemplary embodiment of the invention. Further, the upper portion of FIG. 1 shows a change in the rotational speed ωt(t) of the automatic transmission 12 over time t after the start of the inertia phase (time=0). The lower portion of FIG. 1 shows a change in the engine torque-down amount over time t after the start of the inertia phase.

As shown in the drawing, during a shift, the automatic transmission 12 first moves into the inertia phase (time=0) when control is executed to temporarily reduce the engine torque by a predetermined amount, i.e., when torque-down control is executed. After the inertia phase starts, the input shaft rotational speed ωt(t) gradually decreases. If torque-restore control is started at an appropriate point, the input shaft rotational speed ωt(tir) should become substantially equal to synchronous speed ωt_af at the end of the shift (hereinafter referred to as "shift-end synchronous speed") at the target point for the end of the inertia phase, i.e., at the point at which the target inertia phase time tir has elapsed after the start of the inertia phase. When ωt(tir) equals ωt_af, or when ωt(tir) is slightly lower than ωt_af, problems related to shift shock and durability of the frictional engagement elements and the like are less likely to occur. In contrast, however, if the torque-restore control is started at an inappropriate point, ωt(tir) becomes greater than ωt_af as shown by the chain line in FIG. 1.

In order to avoid ωt(tir) from becoming greater than ωt_af, the technology disclosed in JPA2-308934 required the creation of a map. According to this exemplary embodiment, however, this is not necessary. That is, according to this exemplary embodiment, the ECU 14 and the transmission control apparatus 16 work either in cooperation or separately so as to detect the appropriate torque-restore control starting point according to the dynamic model obtained by the Expression 1 below, and start that torque-restore control.

$$\omega t(tir) = \omega t(t) + \dot{\omega} t(t) \times (tir - t) + \\ A \int_{t}^{tir} \{Tc(t_x) - Tc(t)\} dt_x + B \int_{t}^{tir} \{Te(t_x) - Te(t)\} dt_x$$ [Expression 1]

where
A and B are constants determined by the inertia moment of various members in the transmission, the torque ratio of the torque converter during a shift, and the like;
Tc(t) is the torque transmission capacity of the clutch at time t; and
Te(t) is the engine torque at time t.

Therefore, preferable synchronization can be obtained is close to the desired ωt(tir)=ωt_af shown by the broken line in FIG. 1 without creating the map.

More specifically, in the method illustrated in FIG. 2, the shift-end synchronous speed ωt_af is first calculated according to information such as the gear speed and the like (100). Next, the input shaft rotation speed ωt(tir) is estimated and calculated from the dynamic model based on the target inertia phase time tir, which is set as a target beforehand, and the constants A and B of the integrated term, in addition to the input shaft rotation speed ωt(t) detected successively by a sensor, not shown, the time derivative of that input shaft rotation speed ωt(t), the torque transmission capacity $T_c(t)$ of the clutch in the automatic transmission 12, and the engine torque $T_e(t)$ (102). The processes of steps 100 and 102 are repeated until ωt(tir)=ωt_af is satisfied (104). During that time, the torque-down control continues (106). When ωt(tir)=ωt_af is satisfied (104), the torque-restore control is started (108). Because a map such as the one mentioned above is not necessary to execute this routine, the exemplary embodiment is able to be realized at a lower cost than the related technology because it does not require the man-hours involved in creating the map. Also, by using the dynamic control which includes a linear term for the change over time in the input shaft rotational speed and a term proportional to an integral value of an amount of change in the engine torque and an amount of change in a torque transmission capacity, it is possible to achieve ωt(tir)=ωt_af or a result therearound, i.e., it is possible to achieve preferable synchronization at the point at which the shift ends.

In the routine shown in FIG. 2, steps 100 to 106 are executed at predetermined intervals or at a predetermined frequency so it is possible that ωt(tir) may not exactly equal ωt_af in step 104. It is therefore preferable to actually have a little leeway within which they can be determined to substantially match (i.e., it is preferable to determine that they "substantially match" when the difference between them is substantially negligible). Also, the routine may be such that the torque-restore control starts when ωt(tir) is less than ωt_af. Further, by making the routine such that the torque-restore control starts only when the determination that ωt(tir)=ωt_af or ωt(tir)<ωt_af is obtained consecutively for a predetermined number of times, noise is able to be reduced or reliability is able to be improved.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus which controls a torque of an engine coupled to an input shaft of an automatic transmission during a shift by that automatic transmission, comprising:
    a controller which i) performs torque-down control by which the engine torque is decreased by a predetermined amount, ii) determines, during the torque-down control, a torque-restore control starting point at which time torque-restore control is to be started, and iii) starts the torque-restore control at the torque-restore control starting point so as to gradually restore the engine torque to a value before the torque-down control,
    wherein the controller is adapted to determine the torque-restore control starting point according to a dynamic model which simulates the behavior of the automatic transmission over time from the start of the torque-down control, and so that a rotational speed of the input shaft of the automatic transmission at a target point substantially matches a target speed, wherein the dynamic model correlates the rotational speed of the input shaft of the automatic transmission at the target point with the time elapsed after the start of the torque-down control, and the controller is adapted to estimate the point at which the rotational speed of the input shaft of the automatic transmission at the end of the shift will likely substantially match the target speed if the torque-restore control were started at that point using the dynamic model, and make that point the torque-restore control starting point.

2. The control apparatus according to claim 1, wherein the controller repeatedly executes a process for estimating the rotational speed of the input shaft of the automatic transmission at the target point according to the dynamic model and based on the time from the start of the torque-down control at a predetermined frequency or at predetermined intervals from the start of the torque-down control until the rotational speed of the input shaft of the automatic transmission obtained by that process becomes equal to, or less than, the target speed.

3. The control apparatus according to claim 2, wherein the dynamic model includes a linear term for the time remaining until the target point and a term proportional to an integral value until the target point of at least one of an amount of change in the engine torque that will likely occur by the target point and an amount of change in a torque transmission capacity of a clutch inside the automatic transmission.

4. The control apparatus according to claim 1, wherein the dynamic model includes a linear term for the time remaining until the target point and a term proportional to an integral value until the target point of at least one of an amount of change in the engine torque that will likely occur by the target point and an amount of change in a torque transmission capacity of a clutch inside the automatic transmission.

5. A control method for controlling a torque of an engine coupled to an input shaft of an automatic transmission during a shift by that automatic transmission, comprising the following steps of:
    performing torque-down control for reducing the engine torque by a predetermined amount,
    determining, during that torque-down control, a torque-restore control starting point according to a dynamic model which simulates the behavior of the automatic transmission over time from the start of the torque-down control, and so that a rotational speed of the input shaft of the automatic transmission at a target time substantially matches a target speed, and
    starting the torque-restore control at the torque-restore control starting point so as to gradually restore the engine torque to a value before the torque-down control was performed, wherein the dynamic model correlates a rotational speed of the input shaft of the automatic transmission at the target point with the time elapsed after the start of the torque-down control, and the point at which the rotational speed of the input shaft of the automatic transmission at the end of the shift will likely substantially match the target speed if the torque-restore control were started at that point is estimated using the dynamic model and made the torque-restore control starting point.

6. The control method according to claim 5, further comprising the step of:
    repeatedly executing a process for estimating the rotational speed of the input shaft of the automatic transmission at the target point according to the dynamic model and based on the time from the start of the torque-down control at a predetermined frequency or at predetermined intervals from the start of the torque-down control until the rotational speed of the input shaft of the automatic transmission obtained by that process becomes equal to, or less than, the target speed.

7. The control method according to claim 6, wherein the dynamic model includes a linear term for the time remaining until the target point and a term proportional to an integral value until the target point of at least one of an amount of change in the engine torque that will likely occur by the target point and an amount of change in a torque transmission capacity of a clutch inside the automatic transmission.

8. The control method according to claim 6, wherein the dynamic model includes a linear term for the time remaining until the target point and a term proportional to an integral value until the target point of at least one of an amount of change in the engine torque that will likely occur by the target point and an amount of change in a torque transmission capacity of a clutch inside the automatic transmission.

* * * * *